United States Patent

Gnant et al.

[11] Patent Number: 5,621,538
[45] Date of Patent: Apr. 15, 1997

[54] METHOD FOR SYNCHRONIZING COMPUTERIZED AUDIO OUTPUT WITH VISUAL OUTPUT

[75] Inventors: Richard A. Gnant, Scottsdale; Darrell Smith, Phoenix, both of Ariz.

[73] Assignee: Sirius Publishing, Inc., Phoenix, Ariz.

[21] Appl. No.: 556,635

[22] Filed: Nov. 13, 1995

Related U.S. Application Data

[63] Continuation of Ser. No. 1,731, Jan. 7, 1993, abandoned.
[51] Int. Cl.$^6$ .................. H04N 5/76; H04N 5/91
[52] U.S. Cl. .................. 386/65; 386/96
[58] Field of Search .................. 358/335, 310, 358/342, 311, 341, 343; 360/13, 14.1, 14.2, 14.3; 84/477 R, 478, 462, 453, DIG. 6; 348/500, 515, 552; H04N 5/76, 5/92, 9/79, 5/78, 5/781, 5/782, 5/783, 5/91, 9/475

[56] References Cited

U.S. PATENT DOCUMENTS

| | | |
|---|---|---|
| 4,489,351 | 12/1984 | d'Alayer de Costemore d'Arc .... 358/335 |
| 4,491,879 | 1/1985 | Fine .................. 360/13 |
| 4,743,981 | 5/1988 | Spencer et al. .................. 360/13 |
| 5,131,311 | 7/1992 | Murakami et al. .................. 358/342 |
| 5,233,438 | 8/1993 | Funahashi et al. .................. 358/342 |
| 5,247,126 | 9/1993 | Okamura et al. .................. 358/335 |
| 5,250,747 | 10/1993 | Tsumura .................. 84/477 R |

Primary Examiner—Thai Q. Tran
Attorney, Agent, or Firm—David G. Rosenbaum

[57] ABSTRACT

The inventive method is a method for synchronizing computerized video images with an audio output. The audio output may be in the form of an audio track stored on a compact disk. The synchronization method uses a timing index which corresponds to the audio track on the compact disk. The computer repeatedly reads the audio timing index and compares it to a data table of known video timing codes. Each time the compact disk timing index is read and determined to be greater than or equal to the current value from the data table the next video image is shown.

19 Claims, 4 Drawing Sheets

"NEW YORK, NEW YORK"
35

| SMPTE CODE | CD RED BOOK | NOTE | TEXT |
|---|---|---|---|
| 00:00:16:23 | 00:00:16:58 | F | START |
| 00:00:17:08 | 00:00:17:20 | E | SPREAD |
| 00:00:17:18 | 00:00:17:45 | F | ING |
| 00:00:17:24 | 00:00:17:60 | D | THE |
| 00:00:18:09 | 00:00:18:22 | C | NEWS |
| 00:00:20:26 | 00:00:20:65 | F | I'M |
| 00:00:21:11 | 00:00:21:28 | E | LEAV |
| 00:00:21:22 | 00:00:21:55 | F | ING |
| 00:00:22:02 | 00:00:22:05 | D | TO |
| 00:00:22:12 | 00:00:22:30 | C | DAY |
| 00:00:24:28 | 00:00:24:70 | E | I |
| 00:00:25:13 | 00:00:25:32 | F | WANT |
| 00:00:25:29 | 00:00:25:72 | G | TO |
| 00:00:26:14 | 00:00:26:35 | A | BE |
| 00:00:27:00 | 00:00:27:00 | G# | A |
| 00:00:27:10 | 00:00:27:25 | A | PART |
| 00:00:27:24 | 00:00:27:60 | G | OF |
| 00:00:28:00 | 00:00:28:00 | A | IT |
| 00:00:29:00 | 00:00:29:00 | G# | NEW |
| 00:00:29:10 | 00:00:29:25 | A | YORK |
| 00:00:30:01 | 00:00:30:02 | G# | NEW |
| 00:00:30:10 | 00:00:30:25 | G | YORK |
| . . . | . . . | . . . | . . . |

FIG. 3b

"NEW YORK, NEW YORK"
30

| SMPTE CODE | NOTE |
|---|---|
| 00:00:16:23 | F |
| 00:00:17:08 | E |
| 00:00:17:18 | F |
| 00:00:17:24 | D |
| 00:00:18:09 | C |
| 00:00:20:26 | F |
| 00:00:21:11 | E |
| 00:00:21:22 | F |
| 00:00:22:02 | D |
| 00:00:22:12 | C |
| 00:00:24:28 | E |
| 00:00:25:13 | F |
| 00:00:25:29 | G |
| 00:00:26:14 | A |
| 00:00:27:00 | G# |
| 00:00:27:10 | A |
| 00:00:27:24 | G |
| 00:00:28:00 | A |
| 00:00:29:00 | G# |
| 00:00:29:10 | A |
| 00:00:30:01 | G# |
| 00:00:30:10 | G |
| . . . | . . . |

FIG. 3a

"NEW YORK, NEW YORK"

FIG. 6

METHOD FOR SYNCHRONIZING COMPUTERIZED AUDIO OUTPUT WITH VISUAL OUTPUT

This is a continuation of copending application Ser. No. 08,001,731 filed on Jan. 7, 1993, now abandoned.

BACKGROUND OF THE INVENTION

The current invention relates to the field of multi-media computers and specifically to the process of synchronizing music with a visual display.

It is desirable for many types of computer programs to have audio output, either in the form of tones, words or music, in addition to video output, in the form of text or images displayed on a computer monitor screen. Many computer programs have moving images which appear on the screen as video output. In many circumstances it would be desirable to have audio output timed or synchronized with the visual output.

With a computer it is currently possible to store files containing audio-visual data, such as moving images, on computer readable storage media and display the data on a computer screen. This is often done with the use of compact disc (CD) storage devices, such as CD-ROM or CD-WORM. CD's are often used because of the large volume of storage which they can support.

In many instances CD storage devices can also be used on computer as conventional music CD players. These devices allow conventional audio CD's to played, for audio output, on a computer equipped with amplified stereo speakers or if connected to a stereo system.

One of the problems encountered in the use of CD computer storage devices to play audio CD's is that they all run at different speeds and these speeds cannot be easily controlled by a computer.

This has created a problem for computer programmers who wanted to display video images on the computer and time this with an audio CD track on the attached CD. While they could easily queue the audio track to begin at a designated time, i.e. at the beginning of a series of visual images, once the audio track started it could not be controlled to assure that the audio track would stay in time with the visual images. This is especially true since each CD player runs at a slightly different speed. Therefore, although an audio track may be synchronized to a visual display on a certain computer system, if the same program were to be run on a different computer system the timing would not be the same and the synchronization would not work.

One specific type of computer program where this problem is common is in Karaoke programs. In Karaoke, a popular song is played without the lyrics, and people sing along to the music. Often, the lyrics are either written down on paper for the people so they can sing along to the song. In other versions, the lyrics may be displayed for the persons singing. In some versions of Karaoke, the lyrics are shown to the person singing with the specific words highlighted or emphasized in some manner at the time they are to be sung. This is to help the singer synchronize the words to the music.

In most Karaoke systems, the display highlights the words to be sung by sweeping a highlight color or bar continuously across the words shown or emphasizes the word to be sung at a particular point in the music. This often leads to missed timing because, often in songs it is not merely the words that need to be timed to the music, but rather the individual syllables.

SUMMARY OF THE INVENTION

The current invention is a method of synchronizing CD audio output with computer visual output in a computer system. Specifically, the inventive method allows music in CD audio format to be synchronized to correspond with a computerized visual display sequence. The inventive method uses the computer to repeatedly read a timing index associated with the CD audio track to time the sequence for displaying desired video images. This particular method can be used to display words or syllables from a song at a selected times corresponding to selected points in the audio track for the purpose of playing Karaoke.

It is a purpose of the invention to properly synchronize computerized visual outputs to a audio output stored on a CD in conventional CD audio format.

It is another purpose of the invention to allow Karaoke to be played on a computer with the computer screen showing the syllables to be sung at particular times in the audio track.

It is also a purpose of the invention to allow for a novel method of highlighting lyric syllables of a song at times corresponding to particular points in an audio track of a song as it is played.

BRIEF DESCRIPTION OF THE DRAWINGS

FIGS. 3a and 3b are representative data tables showing the timing sequences used in the inventive method.

FIG. 6 is the sheet music for the song "Theme for New York, N.Y." which is used an example for the inventive method.

DETAILED DESCRIPTION

The present invention is a method for synchronizing a musical or other audio sound track in a computer system to a series of visual displays output by the same computer system.

Figure 1:
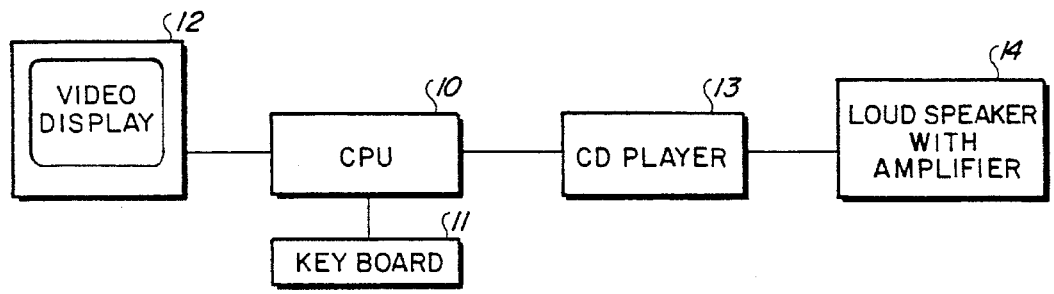
FIG. 1 is a depiction of an embodiment of a computer system designed to implement the inventive method.

A typical computer system which is capable of running the computer software which incorporates the inventive method is shown in FIG. 1. A common computer system includes a central processing unit, also known as a CPU. In FIG. 1 the CPU is shown at 10. The CPU is connected to a keyboard 11 which allows a user to input commands into the CPU. The computer system also contains a video display screen 12 which displays visual images to a person using the computer. The video display screen is capable of displaying video output in the form of text or other visual images. The video display screen can vary in size and if desired other video display devices, such as large screen televisions can be used to display output from the computer. The system shown in FIG. 1 also includes a compact disk drive 13, also known as a CD drive. The CD drive is a device primarily adapted for the storage and accessing of data and its use for this purpose is generally known. As shown in FIG. 1, the CD drive is external to the computer, however, the CD drive could also be placed within the casing in which the CPU is stored. Additional computer devices such as printers and floppy disk drives could also be added to this system.

The CD drive as used with the computer system shown in FIG. 1 is capable of using the CD drive both as a computer data storage device and with the connection of at least one amplified loudspeaker 14, as a device for playing sound recordings recorded in a conventional compact disc audio format. As shown in FIG. 1, an amplified loudspeaker 14 is shown directly connected to the CD drive 13. It should be understood that any other storage device which is capable of storing and playing audio or audio-visual recordings and storing digital information could be used in place of the CD drive. This would include digital audio tape drives, known as DAT drives, laser disk drives, and video cassette recorders.

Generally, a CD drive player is not capable by itself of playing music directly to a loudspeaker. The CD drive must be connected to some type of amplifier. The amplifier may be incorporated into other devices as in the case of amplified loudspeakers or may be separate such as in the form of an amplifier which is part of a stereo system. Both of these systems are generally known. Amplified loudspeakers are generally known for connection to a computer system and are shown at 14 in FIG. 1.

The first step in a system of this type is to produce the audio track or audio signal source and to produce timing codes associated with the audio track or audio signal source. This system will be described with reference to a musical track, but it should be understood that any desired audio output could be used. In the future it is contemplated that devices such as this could be used not only for audio output, but also for audio-visual output. Further, this description will use the words to the song, as in Karaoke, as the visual display to be synchronized with the music. However, it should also be noted that any other visual materials could be displayed in time to an audio output using the method described below.

Figure 2:
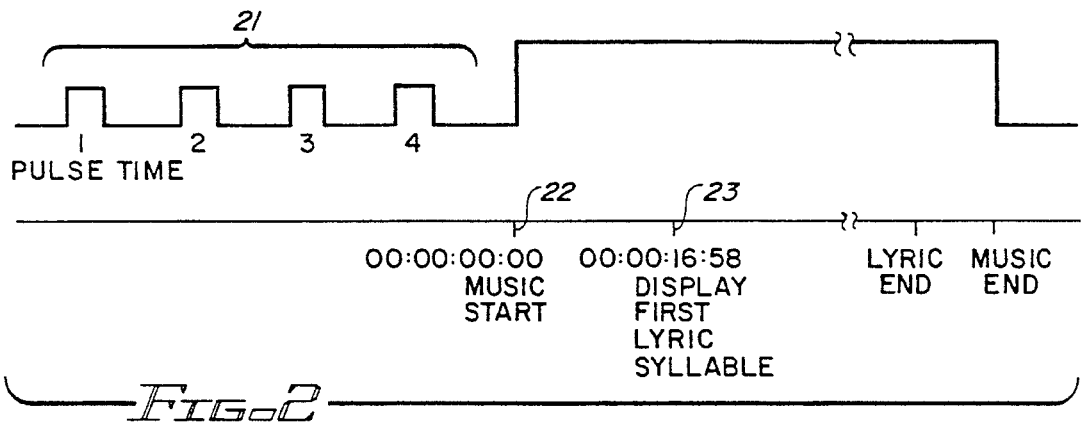
FIG. 2 is a representation of the timing sequence used in the inventive method.

Initially the music is recorded. FIG. 2 shows a graphical representation of the timing of the recorded music. When the music or audio track is recorded, a 4 pulse leader 21 is added to the audio track. This 4 pulse leader 21 is used to set the timing for the beginning of the music so that the exact starting point of the music 22 can be located. Determining the starting point 22 for the music is necessary in order to allow for synchronization with the visual material. After the 4 pulse leader has been added it is edited so that the 4 pulse leader is not audible to the human ear.

After the music is recorded, a process known as "SMPTE time stripping" is performed on the music. This can be done by a computer, if the music was recorded with use of a computer. The Society of Motion Picture and Television Engineers, known as "SMPTE", has set a timing standard used in the motion picture industry. SMPTE time stripping adds timing values in accordance with SMPTE standards, which are those commonly used in the motion picture industry. In the inventive method the musical melody is recorded on a separate track and time stripped. An example of the result of the SMPTE time stripping procedure is shown in FIG. 3a. The same information, with additional information added is shown in FIG. 3b. FIG. 3a shows a timing code 31, in form of hours:minutes:seconds:frames and a corresponding musical note 32, which is the musical note of the melody at that point in the song which corresponds to the timing code 31. FIG. 3a, shows timing code 31 with a time value of 00:00:16:23 corresponds to melody note 32, which shows the note F. All timing codes, such as 31, are times relative to the start of the song as shown at 22 in FIG. 2. In FIG. 2, timing code 31, with a value of 00:00:16:23 corresponds to point 23 in FIG. 2.

This time stripping procedure produces a timing reference number 31 which corresponds to each melody note of the music 32. In other words, what is produced is a data table 30 that corresponds each note in the melody line to a specific SMPTE time reference. All time references are with respect to the beginning of each song 22, although other reference points could be used depending on the nature of the audio works being used.

SMPTE time references are broken down with the hour, minute, second and frame number corresponding to each frame. Traditionally SMPTE references were used in the movie industry which was based on the projection rate of 30 frames per second. So each frame corresponds to 1/30th of a second. This same timing reference is produced by the SMPTE time stripping process. So the SMPTE reference 00:00:16:23 in FIG. 3a represents 0 hours, 0 minutes, 16 and 23/30ths of a second after the start of the song.

Once the SMPTE time reference for each note in the melody is determined an analyst determines which syllable of each lyric corresponds to each note of the melody. The analyst does this by referring to a musical score which shows both the melody line and lyrics for the song. If other video images are being displayed a score showing the music or audio track and the corresponding video images would be used. The result of this process is a data table 35 corresponding each syllable of every song lyric to a corresponding SMPTE time code. In the example shown melody note 32, the note F, at SMPTE time code 00:00:16:23 corresponds to the lyric syllable 37, the word "Start" in the song "New York, N.Y." The analyst performs this task generally by referring to the sheet music for the song, FIG. 6. The anaylst could use other methods for creating this type of data table, such as "playing it by ear".

SMPTE timing is generally not compatible with the timing of music on a compact disc (CD). CD timing in the industry is generally based on time increments of 1/75th of a second. This timing system is the conventional CD Red Book format common in the CD recording industry. Therefore, in order to convert the SMPTE time codes to CD Red Book time codes each SMPTE time code must be multiplied by 2.5 to get the corresponding CD Red Book time reference. This enables the analyst to convert her data table showing the lyric syllables and SMPTE time codes to the more useful lyric syllables and CD Red Book time codes. These CD timing references are also reflected in data table 35. Specifically time reference 31 shown in both tables 30 and 35 is shown in SMPTE format divided by hour:minute:second:frame with 30 frames per second. In table 35 the value of the SMPTE time code is 00:00:16:23 and corresponds to the lyric "Start." In table 35, SMPTE time code 31 has a corresponding CD Red Book time code 36 with a value of 00:00:16:58, which is in the form hours:minutes:seconds:75ths of a second and also corresponds to the word "Start." The data table produced by this process is then stored on the CD with the computer software program. Of course, the data table and software could also be stored on a separate medium, such as a separate floppy disc.

The musical tracks are then recorded on a compact disc in the conventional CD audio format. This format includes recording the corresponding CD Red Book time codes on the compact disc along with the audio track. As stated above, other audio signal sources could be used as long as there is a corresponding audio timing index, or such an index can be provided. Both the audio signals and corresponding audio time index are stored on the CD or other storage device.

Figure 4:
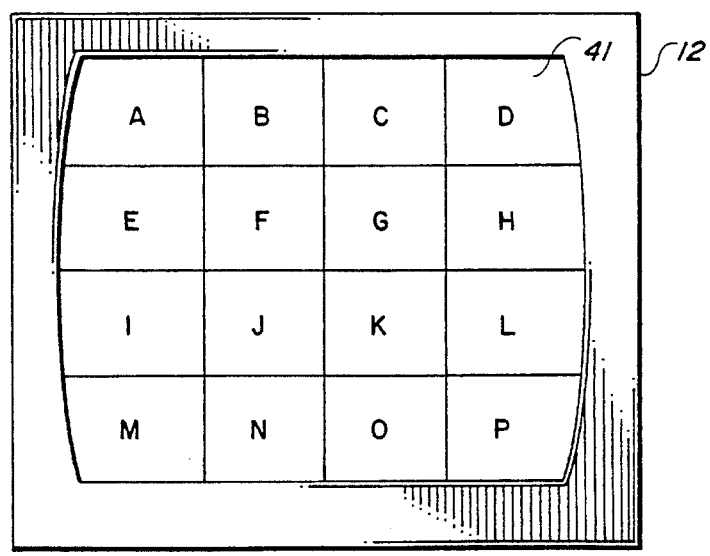
FIG. 4 is a diagrammatic view of a computer monitor screen illustrating a user-interface useful with the present invention.
Figure 5:
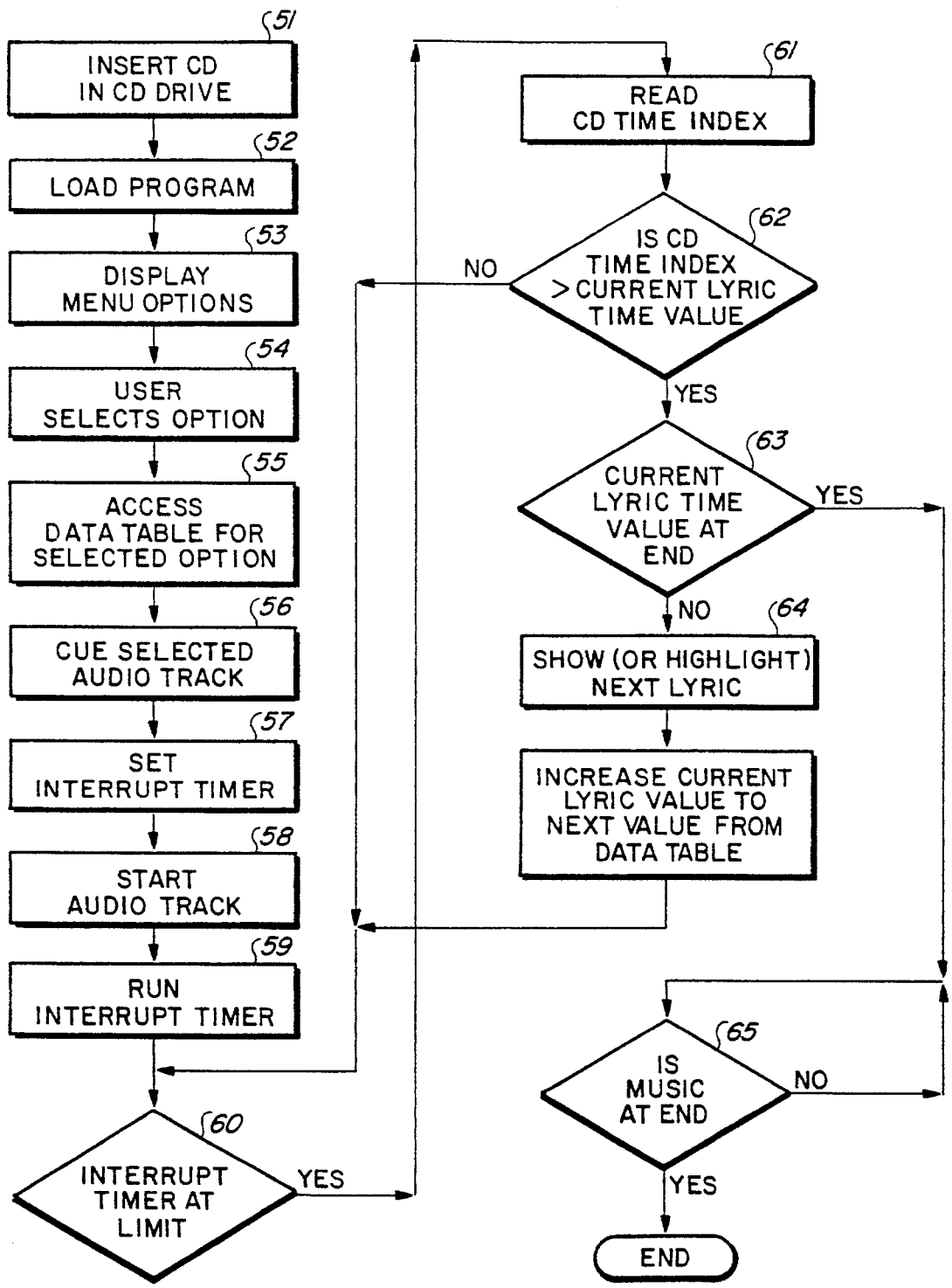
FIG. 5 is a logic diagram of the process of the inventive method.

When, for example, one wishes to run a computer program to play Karaoke, the following process, as illustrated by FIG. 5, takes place in the computer. First, a CD having both a computer program stored on it along with audio tracks for musical works is inserted 51 into a computer having a CD drive. The computer is then given a command to load 52 the computer program from the CD. The program is then loaded 52 into the CPU. Part of the program information loaded into the computer is the data table containing the lyrics to the song, broken down into their syllables, and the corresponding lyric time value data, which is the time at which the lyric or syllable is to be shown or highlighted on the computer screen. This is shown as 52 in FIG. 5. The program then displays song selection information to be displayed on the computer screen 53. This could be in the format shown in FIG. 4.

FIG. 4 shows one method for displaying information regarding available song selections. In this method the screen 12 is divided into a predetermined number of areas. As shown in FIG. 4 the screen 12 is divided into 16 separate areas, labeled A to P in FIG. 4. In each area 41 visual images are shown which correspond to song selections available from the Karaoke program. Each area on the screen 41 can show a fixed visual image or can display moving or changing video images. In order to make a selection, the user selects 54 a specific area 41 of the screen, such as with a mouse, light pen, or through a keyboard selection and then the selected song is played. The multiple display areas on the screen serve as a video menu, allowing the user to select a song from the visual menu. Of course, this type of visual menu display can be used as a input mechanism for other types of computer program. This type of video menu can replace most computer text menu displays and icon selection methods for computer input. Other, conventional input devices could be used, such as a text listing the available songs and the user imputing the letter corresponding to the selected song. Any other generally known user interface could also be used.

When one of selection options A–P is selected 54 a corresponding data file is then accessed 55 by the computer memory. As an alternative, the data file for the selected song may be loaded from the CD data storage at this time. This data file 35 contains a listing of CD time values at which the lyric syllables will be displayed or highlighted so that a singer will know when to sing that lyric or lyric syllable so that it corresponds in time to the melody.

Once a song has been selected 54, the song is cued to the beginning 56 and at the same time a computer interrupt timer is set to a desired time increment 57. The desired time increment may vary depending on how the original information was processed, on the speed of the computer and the number of tasks the computer is performing. If the SMPTE time stripping method described above is used to determine the timing values for the melody, the interrupt timer is set to a value less than or equal to 1/30th of a second in order to assure no information is missed in the timing sequence. A frequently used time increment would be 1/50th of a second (20 milliseconds). The interrupt timer is used to control the time sequence for regularly reading the CD time index.

The song is then begun 58 and the interrupt timer started 59. When the song is begun it is broadcast through the loudspeakers so that it is audible. Every time the interrupt time increment elapses 60 the computer reads 61 the time index on the compact disc. The computer compares 62 the CD time index against the first lyric syllable time value from the data table and if the CD time index is equal to or greater than the first lyric syllable time value from the data table 35 the first lyric syllable is displayed 64. Once the first lyric syllable is displayed the next value from the data table is read and that value is used for comparison with the CD time index 62. This process continues in this manner, with the computer repeatedly checking the lyric syllable time value against the CD time index and displaying or highlighting the appropriate syllables until all of the lyrics have been displayed or highlighted 63, after which the song continues until the audio track is completed 65. Of course, other video images could be displayed in the same manner, with a data table containing the video images to be displayed and the corresponding video time index value.

As an alternative to ending the program after the song is completed, the program could send the user back to the point where the menu options are displayed and allow the user to again select another song to be played. In this system the user would end the program by selecting an end program option from the menu.

In using the computer for Karaoke, a better method than just displaying the proper lyric syllable at the proper time is to display a series of lyrics on the computer screen at all times, but merely to highlight, as with a different color, the lyric syllable that is to be sung at that time. An important feature of this process is that the lyric syllable that should be sung at a particular time stays highlighted continuously until the next lyric syllable should be sung. This helps the person singing know how long to hold each syllable while singing.

In many Karaoke or Karaoke type machines the machine wipes across the displayed lyrics at a constant pace. In this method the singer does not know exactly when to sing each lyric or how long to hold each lyric. In one embodiment of the inventive method, the lyric to be sung is highlighted at precisely the moment when that lyric should be sung. This timing accuracy is possible because of the synchronization described above. Further, the lyric to be sung stays highlighted until it is time for the following lyric or syllable to be sung. This makes it possible for certain syllables to be highlighted for longer or shorter times than other lyrics. This makes it possible for the singer to follow the timing of the melody much more accurately. This method also differs from the wiping process used by most other Karaoke machines because it enables only the lyric syllable to be highlighted rather than sweeping across the displayed lyrics at a constant pace.

Although the inventive method has been described with references to songs and their lyrics, this method can be used with other sounds and visual displays. This would include synchronizing sound effects and music to particular displays on computer games and for use in displaying visual materials such as movies or videotapes on a computer.

While the invention has been described with reference to the preferred embodiments thereof, those skilled in the art will understand that variations in design, detail, size, shape and choice of materials for manufacture may be made and still fall within the spirit and scope of the present invention, which is intended to be limited only by the claims appended hereto.

What is claimed:

1. Method for controlling synchronization of video and audio signals on a computer, comprising the steps of:

a. inputting an audio time index value from a input/output device into the computer;

b. initiating a computer interrupt timing sequence in response to said input audio time index value, said computer interrupt timing sequence having a regular periodicity at a first timing rate;

c. reading a video time index value, having a second timing rate different from the first timing rate, the video time index value being read at least once during each regular period of the computer interrupt timing sequence, the video time index value being read from a data file into at least one memory register of the computer;

d. playing the audio signals from the input/output device such that the audio signals are audible to the human ear;

e. comparing the audio time index value to the video time index value during each regular period of the computer interrupt timing sequence; and f. displaying a video signal mapped at the video time index value in response to an audio time index value which is greater than or equal to the video time index value, such that said video signal is synchronized to said played audio signals.

2. The method according to claim 1, wherein said step of inputting an audio time index value further comprises reading said audio time index value from a compact disc.

3. The method according to claim 1, wherein said step of inputting an audio time index value further comprises the step of assigning a time index value for music notes in a music melody line.

4. The method according to claim 1, wherein said step of inputing an audio time index value further comprises the step of reading at least one file of time index values from a recording medium having a music melody line written thereupon.

5. The method according to claim 3, wherein said step of assigning an audio time index value further comprises the steps of assigning an audio time index value in the format of hours:minutes:seconds:frame, wherein the frame value equals n/75 seconds, where n is an integer between 0 and 75, and writing the frame value onto a recording medium.

6. The method according to claim 1, wherein said step of initiating a computer interrupt timing sequence, further comprises the step of setting an interrupt timer for a cycle less than or equal to 1/30th second.

7. The method according to claim 1, wherein said step of reading a video time index value further comprises the steps of:

a. providing a music lyric score;

b. assigning a plurality of video index values corresponding to a plurality of lyric syllables in the music lyric score;

c. writing said video time index values to at least one data file; and d. reading said data at least one data file to at least one memory register in the computer.

8. The method according to claim 7, wherein said step of assigning a plurality of video index values further comprises the step of assigning a time index value for each lyric syllable in the music score.

9. The method according to claim 8, wherein said step of reading a video time index value further comprises the steps of assigning a video index time value in the form of hour:minute:seconds:frame, in which the frame value equals n/75 seconds, where n is an integer between 0 and 75, and writing the frame value onto a recording medium.

10. Method for synchronization of digitally recorded video and audio signals, comprising the steps of:

a. constructing a data table having a plurality of first time index values based upon a first sampling rate of an audio signal source and a plurality of second time index values based upon a second sampling rate of a video signal source, the first and second sampling rates being different from one another, a plurality of musical notes in a melody line each mapped to a first time index value and a corresponding second time index value and a plurality of video display units each mapped to a first time index value, a corresponding second time index value and a musical note;

b. writing said constructed data table to a computer-readable medium;

c. reading one of said first time index values from the constructed written data table on the computer-readable medium;

d. initiating a timing sequence corresponding to the second sampling rate in response to the first audio time index value, the first timing sequence having a regular periodicity;

e. reading a first of the plurality of musical notes and a first of the plurality of video display units having the second time index value, the second time index value being read at least once during each regular period of the timing sequence;

f. comparing the second time index value read for the musical note with the second time index value read for the video display unit; and g. displaying on a computer display, the video display unit having a read second time index value greater than or equal to the second time index value for the musical note read during the same regular period of the timing sequence.

11. The method according to claim 10, wherein said step of constructing said data table further comprises the step of defining each of said plurality of video display units as lyric syllables.

12. The method according to claim 11, wherein said step constructing a data table further comprises the steps of timing the appearance of musical notes on a one-thirtieth seconds timing period and assigning a first time index value comprising hours:minutes:seconds:frame to at least some musical notes, wherein the frame value equals n/30 seconds, where n is an integer between 0 and 30.

13. The method according to claim 12, wherein said step of assigning a first time index value further comprises the step of converting the frame value into seventy-fifth second values such that the frame value equals n/75 seconds, where n is an integer between 0 and 75, and writing the frame value onto the recording medium.

14. The method according to claim 10, wherein said step of initiating a timing sequence, further comprises the step of setting an interrupt for a cycle less than or equal to 1/30th second.

15. The method according to claim 10, wherein said step of constructing a data table further comprises the step of assigning a second time index value for each lyric syllable in a music lyric score.

16. The method according to claim 10 wherein the step of writing the constructed data table further comprises the step of writing at least one data file of first and second time index values.

17. The method according to claim 16, wherein said step of writing at least one data file of first and second time index values further comprises the step of writing said at least one data file of first and second time index values to a recording medium and reading said at least one data file into at least one memory register of a central processing unit.

18. The method according to claim 10, wherein said step of constructing a data table further comprises the steps of timing the appearance of lyric syllables notes on a one-thirtieth seconds timing period and assigning the second time index value comprising hours:minutes:seconds:frame to at least some musical notes, wherein the frame value equals n/30 seconds, where n is an integer between 0 and 30.

19. The method according to claim 18, wherein said step of assigning an second time index value further comprises the step of converting the frame value into seventy-fifth second values such that the frame value equals n/75 seconds, where n is an integer between 0 and 75, and writing the frame value onto the recording medium.

* * * * *